(12) United States Patent
Rupp et al.

(10) Patent No.: US 10,048,149 B2
(45) Date of Patent: Aug. 14, 2018

(54) RELATIVE PRESSURE SENSOR

(71) Applicant: Endress + Hauser GmbH + Co. KG, Maulburg (DE)

(72) Inventors: Armin Rupp, Weil am Rhein (DE); Raphael Schonhardt, Rheinfelden (DE); Michael Hugel, Lorrach (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 9 days.

(21) Appl. No.: 15/104,031

(22) PCT Filed: Nov. 14, 2014

(86) PCT No.: PCT/EP2014/074650
§ 371 (c)(1),
(2) Date: Jun. 13, 2016

(87) PCT Pub. No.: WO2015/090766
PCT Pub. Date: Jun. 25, 2015

(65) Prior Publication Data
US 2016/0313200 A1    Oct. 27, 2016

(30) Foreign Application Priority Data

Dec. 20, 2013   (DE) .................. 10 2013 114 608

(51) Int. Cl.
*G01L 9/12*    (2006.01)
*G01L 9/00*    (2006.01)
(Continued)

(52) U.S. Cl.
CPC ........ *G01L 9/0075* (2013.01); *G01L 19/0023* (2013.01); *G01L 19/144* (2013.01)

(58) Field of Classification Search
None
See application file for complete search history.

(56) References Cited

U.S. PATENT DOCUMENTS 5,036,884 A * 8/1991 Miller .................. G01F 1/36
                                                137/270
6,105,437 A   8/2000 Klug
(Continued)

FOREIGN PATENT DOCUMENTS

DE      10135568 A1    2/2003
DE      10316033 A1    10/2004
(Continued)

OTHER PUBLICATIONS

German Search Report, German Patent Office, Munich, DE, dated Feb. 11, 2014.
(Continued)

*Primary Examiner* — Andre Allen
(74) *Attorney, Agent, or Firm* — Bacon & Thomas, PLLC

(57) ABSTRACT

A relative pressure sensor (1) includes a pressure measuring cell (10) having a measuring diaphragm (12), a main body (14) which is connected to said measuring diaphragm, and a the measuring chamber between the measuring diaphragm and main body, a reference pressure being applied to the measuring chamber by a reference pressure channel (18) which runs from a rear face (16) of the main body (14) through the main body (14); a clamping ring (38); and a housing (40) which has at least one housing body (42) with a measuring cell chamber (46), wherein the pressure measuring cell (10) is clamped in the measuring cell chamber (46) by the clamping ring (38). The housing has a reference air opening (48) which communicates with the reference pressure channel (18) by a reference air path which has a path volume which is separate from the volume of the measuring cell chamber, wherein the reference air path has a section which runs along the rear face of the main body, wherein the section is bounded by the rear face of the main body and a guide body, which guide body is clamped in against the rear face of the main body and covers an opening (Continued)

of the reference pressure channel (18) in the rear face of the main body.

11 Claims, 2 Drawing Sheets

(51) Int. Cl.
*G01L 19/00* (2006.01)
*G01L 19/14* (2006.01)

(56) References Cited

U.S. PATENT DOCUMENTS

| | | | |
|---|---|---|---|
| 6,134,969 A | 10/2000 | Studer | |
| 6,425,291 B1 * | 7/2002 | Flogel | G01L 13/023 73/729.1 |
| 6,508,130 B2 * | 1/2003 | Werner | G01L 9/0075 73/756 |
| 6,639,724 B2 * | 10/2003 | Bower | B81C 1/00666 359/296 |
| 6,753,021 B2 * | 6/2004 | Goswami | A61K 36/185 424/765 |
| 6,848,318 B2 * | 2/2005 | Gerst | G01L 9/0075 73/715 |
| 7,140,256 B2 | 11/2006 | Flogel | |
| 7,152,477 B2 | 12/2006 | Banholzer | |
| 7,437,937 B2 | 10/2008 | Becher | |
| 2002/0181110 A1 * | 12/2002 | Bower | G02B 1/116 359/586 |
| 2005/0269256 A1 * | 12/2005 | Haq | B01D 46/0013 210/490 |
| 2009/0158853 A1 * | 6/2009 | Berner | G01L 9/0075 73/724 |
| 2012/0174681 A1 * | 7/2012 | Drewes | G01L 9/0075 73/724 |
| 2013/0327151 A1 * | 12/2013 | Berlinger | G01L 9/0075 73/756 |
| 2015/0122040 A1 | 5/2015 | Drewes | |

FOREIGN PATENT DOCUMENTS

| | | |
|---|---|---|
| DE | 102006049942 A1 | 4/2008 |
| DE | 102012103585 A1 | 10/2013 |
| EP | 0915326 A1 | 5/1999 |
| EP | 0984257 A1 | 3/2000 |
| WO | 03058186 A2 | 7/2003 |

OTHER PUBLICATIONS

International Search Report, EPO, The Netherlands, dated Mar. 30, 2015.
English Translation of the International Preliminary Report on Patentability, WIPO, Geneva, CH, dated Jun. 30, 2016.

* cited by examiner

RELATIVE PRESSURE SENSOR

FIELD OF THE INVENTION

The present invention relates to a relative pressure sensor. Relative pressure sensors for use in process measuring technology usually comprise a pressure measuring cell, which is arranged in a housing and which can be exposed on its front face to a medium to be measured, whereby the pressure of said medium is to be measured. On the rear face, the pressure measuring cell is supplied with ambient pressure via a reference air channel, so that the pressure measurement can be performed in relation to the ambient pressure as intended.

BACKGROUND OF THE INVENTION

The design of measuring devices in general and of relative pressure sensors in particular is more and more subject to the constraint of having to comply with the requirements of a platform, in order to save costs on the one hand and to shorten development times for modifications within a platform on the other hand. This creates the requirement of being able to use a pressure measuring cell—in particular, a ceramic pressure measuring cell—in a multitude of designs in a flexible manner. However, a ceramic pressure measuring cell requires comparatively long development times, meaning that a quick adaptation to new construction requirements, such as variations in a housing form, is impossible to perform. In particular, the electrical connections for an electromechanical transducer of a pressure measuring cell and the position of a reference air channel of a relative pressure measuring cell have to be accepted as given, in the context of the device design.

There is, therefore, a need for a design principle for a relative pressure sensor, which would allow for a sufficient level of flexibility. Hence, the present invention is based upon the task of providing a relative pressure sensor, which complies with such a design principle. The task is solved according to the invention by the relative pressure sensor according to the independent patent claim 1.

SUMMARY OF THE INVENTION

The relative pressure sensor according to the invention comprises: a pressure measuring cell having a measuring diaphragm and a main body, whereby the measuring diaphragm is connected to said main body in a pressure-tight manner by forming a measuring chamber between said measuring diaphragm and the main body, wherein a reference pressure can be applied to said measuring chamber by means of a reference pressure channel, which extends from a rear face of the main body that is facing away from the measuring chamber through the main body to the measuring chamber; a clamping ring; and a housing which has at least one housing body with a measuring cell chamber inside of it, wherein the pressure measuring cell is arranged in the measuring cell chamber and clamped by the clamping ring in an axial position, wherein the housing has a reference air opening which communicates with the reference pressure channel by means of a reference air path which runs through the measuring cell chamber and has a path volume which is separate from the volume of the measuring cell chamber, wherein the reference air path has a section which runs along the rear face of the main body, wherein the section is bounded by the rear face of the main body and a guide body, which guide body is—particularly by means of a shunt—clamped in against the rear face of the main body and covers an opening of the reference pressure channel in the rear face of the main body.

In a further development of the invention, the elastic guide body features an at least partly thermoelastic material.

In a further development of the invention, the guide body is equipped with protruding sealing contours on its bottom that is facing the main body, which sealing contours abut against the rear face of the main body, wherein the sealing contours seal the reference air path section from the volume of the measuring cell chamber.

In a further development of the invention, the guide body has an opening in a first end section, which opening is connected to a reference air line, by means of which the reference air path section communicates with the reference air opening.

In a further development of the invention, the reference air line features a dimensionally stable material—in particular, a thermoplastic, a metal, a glass, or a ceramic.

In a further development of the invention, the pressure measuring cell has a transducer for converting a pressure-dependent deformation of the measuring diaphragm into an electrical signal—particularly, a capacitive transducer—wherein the transducer is contacted by at least one electrical conductor path, which is prepared on the rear face of the counter body, wherein the conductor path is separated from the reference air path by the guide body, so that the conductor path runs outside the reference air path.

In a further development of the invention, the reference air opening has an axial distance to the rear face of the counter body, wherein the length of the reference air line amounts to not more than 1.5 times—particularly, not more than 1.2 times, and, especially, not more than 1.1 times—the length of the axial distance between the reference air opening and the rear face of the counter body.

In a further development of the invention, the reference pressure channel exits the rear face of the main body at a first azimuthal position, wherein the reference air opening of the housing has a second azimuthal position which differs from the first azimuthal position, wherein the section of the reference air path, which extends between the guide body and the main body, runs from the first azimuthal position to at least the second azimuthal position.

In a further development of the invention, the relative pressure sensor further comprises a decoupling ring, whereby the decoupling ring is clamped between the clamping ring and the rear face of the main body.

In a further development of the invention, the decoupling ring has a shoulder that faces radially inward on its top side, which top side is facing away from the main body, with which shoulder the guide body is clamped in the shunt against the main body.

Relative pressure sensor according to one of the preceding claims, wherein the path volume of the reference air path amounts to no more than 2%—preferably, no more than 0.5% and, especially, no more than 0.25%—of the third power of one length of the reference air path between the reference air opening of the housing and the opening of the reference pressure channel on the rear face of the main body.

The invention is explained in the following in further detail on the basis of the exemplary embodiments shown in the figures. Illustrated are:

DETAILED DESCRIPTION OF THE INVENTION

Figure 1:
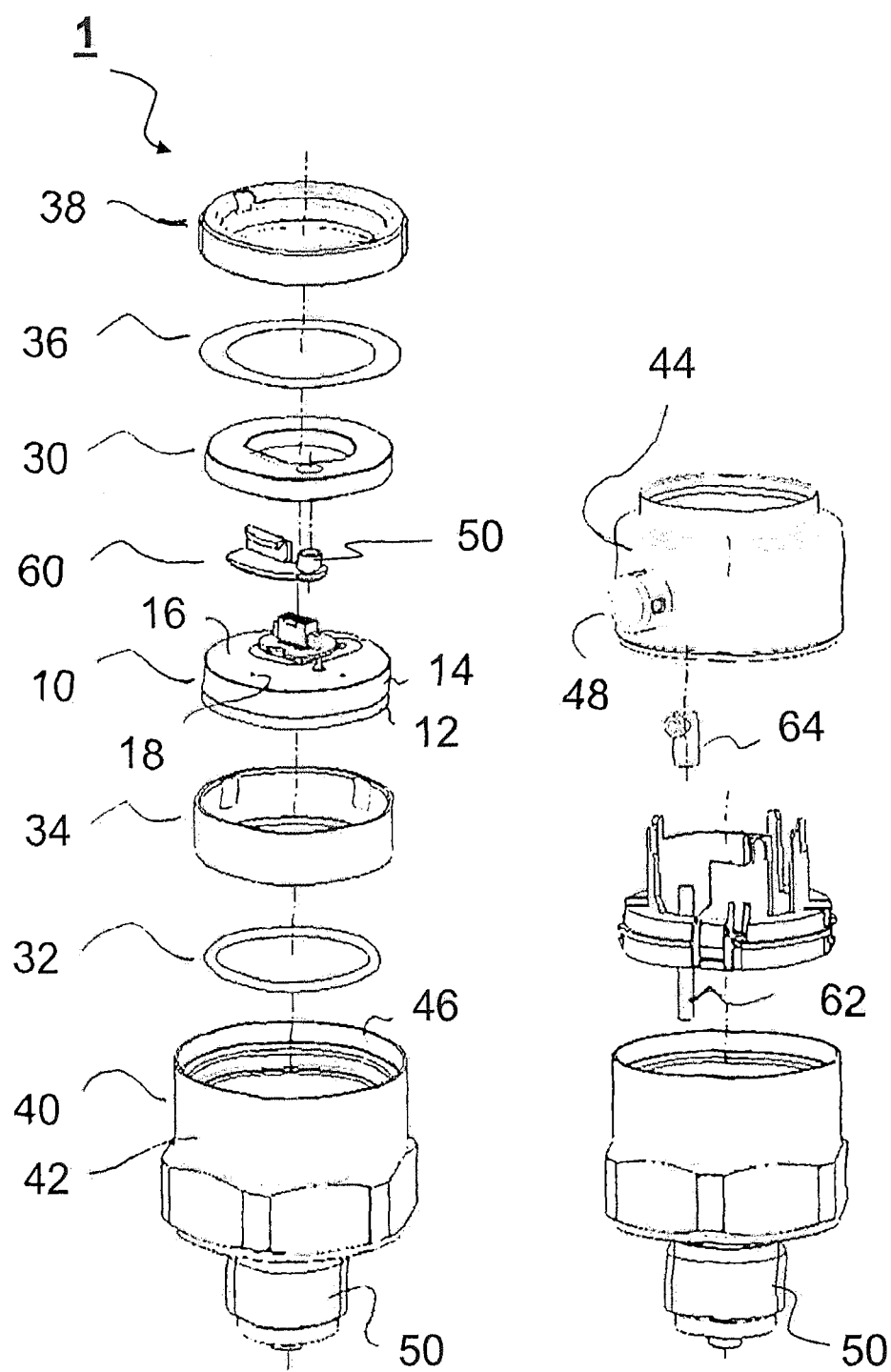
FIG. 1: an exploded view of the relative pressure sensor according to the invention.

The relative pressure sensor shown in FIG. 1 comprises a relative pressure measuring cell 10, having a disc-shaped measuring diaphragm 12 and a counter body 14, wherein the measuring diaphragm 12 and the counter body are connected to each other in such a way that they form a measuring chamber. The measuring chamber is connected via the reference air channel 18, which exits the counter body on a rear face 16 of the counter body 14, which rear face faces away from the measuring diaphragm. The relative pressure sensor 1 further comprises a housing 40 with a housing body 42 having a measuring cell chamber 46 inside of it, in which measuring cell chamber the relative pressure measuring cell 10 is inserted. Herein, a sealing ring 32 is elastically clamped between the measuring diaphragm 12 and a sealing surface (not depicted) inside the housing chamber 46, whereby the relative pressure measuring cell 10 and the sealing ring are guided laterally by a ring 34, which features plastic. The relative pressure measuring cell 10 is clamped against the elastic sealing ring 32 by means of a clamping ring 38, which clamping ring is screwed into a thread in the measuring cell chamber 46, whereby, between the rear face of the counter body 14 of the pressure measuring cell 10 and the clamping ring 38, a decoupling ring 30 and a sliding film 36 are arranged. The decoupling ring 30 is of the same material as the counter body 14 of the pressure measuring cell—in particular, corundum—and abuts directly against the rear face 16 of the counter body 14. The sliding film 36 is clamped between the decoupling ring 30 and the clamping ring 38, which clamping ring features a metal—in particular, brass—in order to minimize friction forces between the decoupling body and the clamping ring.

In order to be able to expose the reference air channel 18 to reference air via a defined reference air path that has a small enclosed volume, several components are provided that interact with each other and are easy to install. Some details are explained below using the figures one and two. The reference air path comprises, first of all, a guide body 60 made from an elastic material, e.g., a rubber, wherein the guide body 60 has a groove on the bottom side facing the counter body, which groove, when the bottom side 16 abuts against the counter body 14, works together with the counter body like a closed line section. The guide body 60 can have one or more supporting ribs running in longitudinal direction in sections inside the groove, so that the groove is not compressed by the clamping force to such a degree as to interrupt the line section. The line section has the form of a circular arc, which extends from the exit opening of the reference air channel 18 on the rear face 16 of the counter body 14 to a connection point, from where a reference air line 62 runs from a reference air opening 48 inside the housing 40 to the relative pressure measuring cell ten. In order to enable the reception of the reference air line 62, which, in particular, features a dimensionally stable plastic, the guide body 60 has an opening 61 on its top side, which opening is surrounded by an elastic rim, into which a bottom end section of the reference air line 62 can be inserted. In order to enable the positioning of the comparatively soft guide body 60 in a defined manner in relation to the reference air channel 18, and in order to additionally clamp it against the rear face 16 of the counter body 14 with a defined clamping force, the decoupling body 30 has a shoulder 30 A, which extends inside in a radial direction on its top side, by means of which shoulder a section of the guide body 60, which has the groove, is clamped against the counter body 14. For easier installation, the guide body 60 has an extension, which encompasses the radial shoulder 30 A, and an axial projecting piece, which forms the elastic rim around the opening 61 and extends in a force fit manner through a hole 30 B in the radial shoulder 30 A. By means of these structural elements, the guide body 60 needs to be installed at the decoupling body 30 in a defined manner, before both components are inserted together into the measuring cell chamber 46. After the relative pressure measuring cell 10 has been clamped with the clamping ring 38 and the components that are positioned in between, an electronic carrier 70 can be inserted into the measuring cell chamber, wherein the reference air line 62 is arranged at the electronic carrier 70 and is automatically pushed into the opening 61 of the guide body with its bottom side when the electronic carrier is installed. To make the reference air path complete, an angle piece 64 has to be placed on the top end of the reference air line 62, which angle piece then communicates with a reference air opening 48 in a cylindrical surface of a second housing body 44, which has to be positioned on top of the first housing body 42.

For the sake of completeness, it should be mentioned that the housing 40 can be equipped with any number of process connections on its first housing body 42 at the bottom, via which process connections the pressure measuring cell can be exposed to a pressure to be measured. In FIG. 1, for example, a process connection pin with a thread is depicted.

Figure 2:
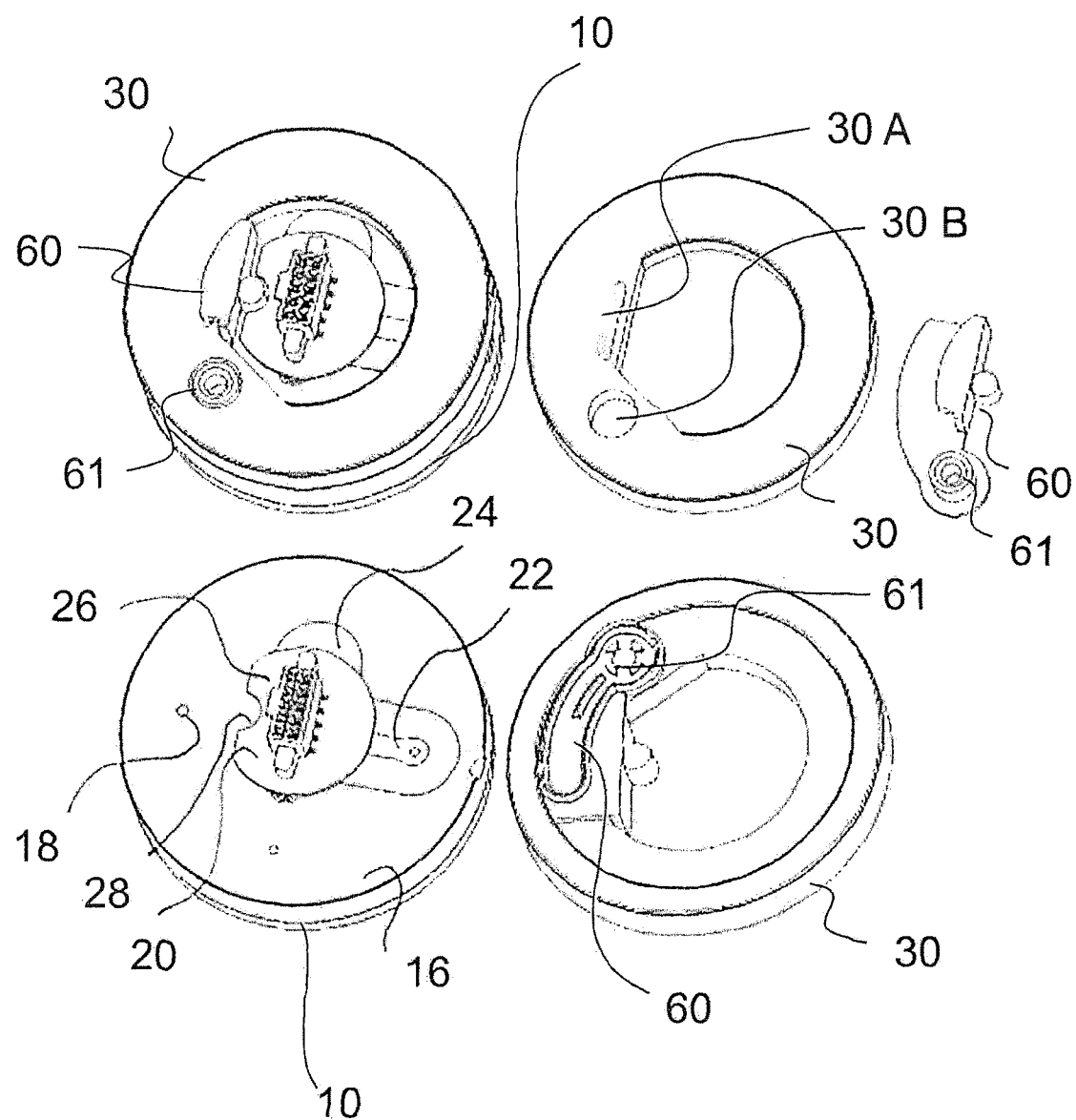
FIG. 2: perspective detail views of components of the relative pressure sensor according to the invention.

Further details of the invention will now be explained, with reference to FIG. 2. The pressure measuring cell 10 has a capacitive transducer, which is functioning, in particular, as a differential capacitor, having two electrodes on the side of the counter body, wherein the potentials of the electrodes have to be fed through ducts to the rear face 16 of the counter body and then, via the conductor paths 22, 24, further fed to a pre-processing circuit 20. The pre-processing circuit 20 is arranged in a compact hybrid on the rear face 16 of the pressure measuring cell, so that the signal paths for the raw signals of the differential capacitor can be kept as short as possible. For easy installation, the hybrid is equipped with a connector element 26, which connector element is used, on the one hand, to issue pre-processed digitized measurement signals and, on the other hand, to supply the hybrid with energy. A recess 28 on a carrier body of the connector element 26 provides the orientation for a projecting piece on the guide body 60, so that the guide body is positioned correctly in relation to the reference air channel 18. Conducting the reference air inside the reference air path serves the purpose of preventing moisture from the reference air from condensing on the conductor paths 22, 24 on the rear face of the counter body, which would impair the measurement. Furthermore, the limited volume of the reference air path, which preferably amounts to less than half a percent of the measuring cell chamber volume, has the effect that temperature fluctuations, which are as good as inevitable in a process environment, and the resulting changes in volume of an enclosed gas, result in only a minimal volume increase for the reference air path, so that, due to that fact, the amount of air that needs to pass through the reference air opening 48 is hardly worth mentioning.

The invention claimed is:
1. Pressure measurement sensor, comprising:
   a pressure measuring cell having a measuring diaphragm and a main body, wherein the measuring diaphragm is connected to the main body in a pressure-tight manner by forming a measuring chamber between the main body and the measuring diaphragm, wherein the measuring chamber is exposable to a reference pressure via a reference pressure channel, which extends from the measuring chamber through the main body to a rear face of the main body, which rear face is facing away from the measuring chamber; a clamping ring; and a housing, having at least one housing body, which contains a measuring cell chamber inside, wherein the pressure measuring cell is arranged inside the measuring cell chamber and is clamped in an axial position by the clamping ring, which clamping ring is in mesh with the housing body, wherein the housing has a reference air opening, whereby the reference pressure channel communicates with the reference air opening via a reference air path, which runs through the measuring cell chamber and has a path volume that is separate from the measuring cell chamber, wherein the reference air path has a section that runs along the rear side of the main body, wherein the section is bounded by a guide body and the rear face of the main body, wherein the guide body is clamped against the rear face of the main body—in particular, by a shunt—and covers an opening of the reference pressure channel in the rear face of the main body.

2. Relative pressure sensor according to claim 1, wherein the elastic guide body features an at least partly thermoelastic material.

3. Relative pressure sensor according to claim 1, wherein the guide body is equipped with protruding sealing contours on its bottom that is facing the main body, which sealing contours abut against the rear face of the main body, wherein the sealing contours seal the reference air path section from the volume of the measuring cell chamber.

4. Relative pressure sensor according to claim 1, wherein the guide body has an opening in a first end section, which opening is connected to a reference air line, by means of which the reference air path section communicates with the reference air opening.

5. Relative pressure sensor according to claim 4, wherein the reference air line features a dimensionally stable material—in particular, a thermoplastic, a metal, a glass, or a ceramic.

6. Relative pressure sensor according to claim 5, wherein the pressure measuring cell has a transducer for converting a pressure-dependent deformation of the measuring diaphragm into an electrical signal—particularly, a capacitive transducer—wherein the transducer is contacted by at least one electrical conducting path, which is prepared on the rear face of the counter body, wherein the conducting path is separated from the reference air path by the guide body.

7. Relative pressure sensor according to claim 4, wherein the reference air opening has an axial distance to the rear face of the counter body, wherein the length of the reference air line amounts to not more than 1.5 times—particularly, not more than 1.2 times, and, especially, not more than 1.1 times—the length of the axial distance between the reference air opening and the rear face of the counter body.

8. Relative pressure sensor according to claim 1, wherein the reference pressure channel exits the rear face of the main body at a first azimuthal position, and wherein the reference air opening of the housing has a second azimuthal position, which differs from the first azimuthal position, wherein the section of the reference air path, which extends between the guide body and the main body, runs from the first azimuthal position to at least the second azimuthal position.

9. Relative pressure sensor according to claim 1, further comprising a decoupling ring, wherein the decoupling ring is clamped between the clamping ring and the rear face of the main body.

10. Relative pressure sensor according to claim 9, wherein the decoupling ring has a shoulder that faces radially inward on its top side, which top side is facing away from the main body, with which shoulder the guide body is clamped in the shunt against the main body.

11. Relative pressure sensor according to claim 1, wherein the path volume of the reference air path amounts to no more than 2%—preferably, no more than 0.5% and, especially, no more than 0.25%—of the third power of one length of the reference air path between the reference air opening of the housing and the opening of the reference pressure channel on the rear face of the main body.

* * * * *